(12) United States Patent
Woo et al.

(10) Patent No.: US 12,483,054 B2
(45) Date of Patent: Nov. 25, 2025

(54) CHARGER CAPABLE OF BIDIRECTIONAL POWER TRANSFER

(71) Applicants: Hyundai Motor Company, Seoul (KR); Kia Corporation, Seoul (KR)

(72) Inventors: Dong Gyun Woo, Hwaseong-si (KR); Hyun Wook Seong, Hwaseong-si (KR); Jae Hyun Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 925 days.

(21) Appl. No.: 17/695,959

(22) Filed: Mar. 16, 2022

(65) Prior Publication Data

US 2023/0025867 A1  Jan. 26, 2023

(30) Foreign Application Priority Data

Jul. 22, 2021 (KR) .................. 10-2021-0096609

(51) Int. Cl.
*H02J 7/00* (2006.01)
*H02J 7/02* (2016.01)
(Continued)

(52) U.S. Cl.
CPC .............. *H02J 7/0068* (2013.01); *H02J 7/02* (2013.01); *H02M 1/4233* (2013.01);
(Continued)

(58) Field of Classification Search
CPC ........ H02J 7/0068; H02J 7/02; H02J 2207/20; H02M 3/33573; H02M 1/4233
(Continued)

(56) References Cited

U.S. PATENT DOCUMENTS 5,982,652 A * 11/1999 Simonelli ............ H05K 7/1492
    307/26
6,266,260 B1 * 7/2001 Zahrte, Sr. ............. H02J 9/062
    363/132
(Continued)

FOREIGN PATENT DOCUMENTS

KR   10-2016-0057524 A    5/2016
KR   10-2018-0078779 A    7/2018

*Primary Examiner* — Alexis B Pacheco
(74) *Attorney, Agent, or Firm* — Morgan, Lewis & Bockius LLP

(57) ABSTRACT

Disclosed herein is a charger capable of bidirectional power transfer. A power factor compensation circuit converts a multi-phase AC voltage into a DC voltage and includes a plurality of inductors and a plurality of switching elements. The DC voltage converted by the power factor compensation circuit is applied to a DC link capacitor. A bidirectional DC converter bidirectionally converts the magnitude of a voltage between the DC link capacitor and a battery. In DC power supply mode, a controller controls the bidirectional DC converter to convert a magnitude of a voltage of the battery to apply the voltage of the battery to the DC link capacitor and controls the plurality of switching elements to generate a DC supply voltage by converting the magnitude of the DC voltage of the DC link capacitor and output the DC supply voltage through a terminal through which the multi-phase AC voltage is input.

14 Claims, 2 Drawing Sheets

(51) Int. Cl.
  *H02J 7/14*    (2006.01)
  *H02M 1/42*   (2007.01)
  *H02M 3/335*  (2006.01)

(52) U.S. Cl.
  CPC ... *H02M 3/33573* (2021.05); *H02M 3/33584* (2013.01); *H02J 2207/20* (2020.01)

(58) Field of Classification Search
  USPC .......................................................... 320/109
  See application file for complete search history.

(56) References Cited

U.S. PATENT DOCUMENTS

| | | | |
|---|---|---|---|
| 7,518,891 B2 * | 4/2009 | Wei | H02M 1/126 363/40 |
| 9,548,714 B2 * | 1/2017 | Abou-Alfotouh | H02M 3/1582 |
| 2005/0024023 A1 * | 2/2005 | Chang | H02M 1/4216 323/207 |
| 2011/0254379 A1 * | 10/2011 | Madawala | H02J 7/00712 307/104 |
| 2012/0176084 A1 * | 7/2012 | Klaes | B60L 53/24 320/107 |
| 2014/0177293 A1 * | 6/2014 | Eckhardt | H02M 1/12 363/37 |
| 2014/0293668 A1 * | 10/2014 | Trainer | H02M 7/4835 363/71 |
| 2015/0061569 A1 * | 3/2015 | Alexander | B60L 53/63 320/109 |
| 2015/0137751 A1 * | 5/2015 | King | B60L 53/63 320/109 |
| 2016/0016479 A1 * | 1/2016 | Khaligh | H02M 1/4258 336/170 |
| 2016/0288664 A1 * | 10/2016 | Biagini | B60L 53/63 |
| 2018/0254732 A1 * | 9/2018 | Smolenaers | H02J 1/12 |
| 2019/0267836 A1 * | 8/2019 | Paatero | H02J 9/061 |
| 2020/0136524 A1 * | 4/2020 | Chen | H02M 7/4826 |
| 2020/0324665 A1 * | 10/2020 | Mackenzie | B60L 53/22 |
| 2021/0155100 A1 * | 5/2021 | Khaligh | B60L 55/00 |
| 2021/0188106 A1 * | 6/2021 | Asa | H02M 1/4216 |
| 2022/0320999 A1 * | 10/2022 | Marchais | H02J 7/007 |

* cited by examiner

CHARGER CAPABLE OF BIDIRECTIONAL POWER TRANSFER

CROSS REFERENCE TO RELATED APPLICATION

The present application claims priority of Korean Patent Application No. 10-2021-0096609 filed on Jul. 22, 2021, the entire contents of which is incorporated herein for all purposes by this reference.

TECHNICAL FIELD

The present disclosure relates generally to a charger capable of bidirectional power transfer and, more particularly, to a charger capable of bidirectional power transfer, the charger being configured to convert alternating current (AC) power provided from an external source outside a vehicle into direct current (DC) power to charge an in-vehicle battery and to output DC power to the outside of the vehicle from the in-vehicle battery.

BACKGROUND

In general, an electric vehicle or a plug-in hybrid vehicle including a battery configured to be charged with power supplied from an external source is provided with an on-board charger (OBC) converting external alternating current (AC) power into direct current (DC) power to charge the battery.

Recently, as a variety of technologies for management of power sources, such as a smart grid, have been proposed, research is being conducted on methods of providing power stored in an in-vehicle battery to a grid or other devices using a vehicle as an energy storage device.

In the related art, as a method of allowing a vehicle to provide power stored in a battery to the outside, a technology of fabricating an on-board charger to be capable of bidirectional power transfer has been proposed. In a battery charge mode, the related-art charger capable of bidirectional power transfer converts external AC power into DC power and provides the DC power to a battery so that the battery is charged. In a mode in which the battery is used as an energy storage device, the related-art charger converts DC power stored in the battery into AC power so that the AC power is output to the outside.

As described above, since the related-art charger capable of bidirectional power transfer converts DC power stored in the battery into AC power and provides the AC power to the outside of the vehicle, there are drawbacks in that the related-art charger cannot provide the DC power to a device operating on DC power or an external battery without separately converting the DC power into the AC power.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a charger capable of bidirectional power transfer, the charger being configured to convert alternating current (AC) power, provided to a vehicle from an external source, into direct current (DC) power to charge an in-vehicle battery and to output DC power to the outside of the vehicle from the in-vehicle battery.

According to one aspect, there is provided a charger capable of bidirectional power transfer, including: a power factor compensation circuit configured to convert a multi-phase AC voltage into a DC voltage and including a plurality of inductors and a plurality of switching elements; a DC link capacitor to which the DC voltage converted by the power factor compensation circuit is applied; a bidirectional DC converter configured to bidirectionally convert a magnitude of a voltage between the DC link capacitor and a battery; and a controller. In DC power supply mode, the controller may be configured to control the bidirectional DC converter to convert the magnitude of a voltage of the battery to apply the voltage of the battery to the DC link capacitor and control the plurality of switching elements to generate a DC supply voltage by converting the magnitude of the DC voltage of the DC link capacitor and output the DC supply voltage through a terminal through which the multi-phase AC voltage is input.

The power factor compensation circuit may include: a plurality of input/output terminals through each of which the multi-phase AC voltage is input or the DC supply voltage is output; a plurality of inductors respectively having one end connected to a corresponding one of the plurality of input/output terminals; and a bridge circuit including a plurality of legs connected to the DC link capacitor in parallel, each of the plurality of legs including two switching elements connected in series among the plurality of switching elements. Nodes in the plurality of legs, to which the switching elements are connected, may be connected to the other ends of the plurality of inductors, respectively.

In the DC power supply mode, the controller may be configured to control the switching elements to apply the DC voltage of the DC link capacitor to the plurality of input/output terminals by converting the magnitude of the DC voltage of the DC link capacitor. In battery charge mode in which the battery is to be charged, the controller may be configured to control the switching elements to convert the AC voltage applied to the plurality of input/output terminals into the DC voltage and to apply the DC voltage to the DC link capacitor.

The power factor compensation circuit may further include a bypass switch connected to both ends of one inductor among the plurality of inductors to selectively form a bypass path of the inductor to which the bypass switch is connected.

In the DC power supply mode, the controller may be configured to control the bypass switch in a short-circuit state, control one switching element connected to a high potential terminal of the DC link capacitor, among the switching elements of the leg connected to the inductor to which the bypass switch is connected, to remain in an open state, and control the other switching element connected to a low potential terminal of the DC link capacitor, among the switching elements of the leg connected to the inductor to which the bypass switch is connected, to remain in a short-circuit state.

The power factor compensation circuit may further include an additional switch configured to selectively determine an electric connection state between two input/output terminals among the plurality of input/output terminals.

In the DC power supply mode, the controller may be configured to control the additional switch in a short-circuit state, and perform PWM control on the switching elements in a leg among the plurality of legs, connected to one end of the additional switch through a corresponding inductor among the plurality of inductors, and the switching elements in a leg among the plurality of legs, connected to the other end of the additional switch through a corresponding inductor among the plurality of inductors, at the same duty ratio.

In the DC power supply mode, the controller may be configured to control the additional switch in an open state, and perform PWM control on the switching elements in a leg among the plurality of legs, connected to one end of the additional switch through a corresponding inductor among the plurality of inductors, and the switching elements in a leg among the plurality of legs, connected to the other end of the additional switch through a corresponding inductor among the plurality of inductors, at different duty ratios.

According to another aspect, there is provided a charger capable of bidirectional power transfer. The charger may include a power factor compensation circuit. The power factor compensation circuit may include: a first input/output terminal; a first inductor having one end connected to the first input/output terminal; a second input/output terminal; a second inductor having one end connected to the second input/output terminal; a third input/output terminal; a third inductor having one end connected to the third input/output terminal; and a bridge circuit including a first leg including two switching elements connected in common to the other end of the first inductor, a second leg connected to the first leg in parallel and including two switching elements connected in common to the other end of the second inductor, a third leg connected to the first leg in parallel and including two switching elements connected in common to the other end of the third inductor. The charger may include: a DC link capacitor connected to the first leg in parallel; a bidirectional DC converter configured to bidirectionally convert the magnitude of a voltage between the DC link capacitor and a battery; and a controller. In DC power supply mode, the controller may be configured to control the bidirectional DC converter to convert the magnitude of a voltage of the battery to apply the voltage of the battery to the DC link capacitor and control the switching elements of the first to third legs to convert the magnitude of the DC voltage of the DC link capacitor to be output to the first to third input/output terminals.

The power factor compensation circuit may further include a bypass switch connected to both ends of the third inductor to selectively form a bypass path of the third inductor.

In the DC power supply mode, the controller may be configured to control the bypass switch in a short-circuit state, control one switching element connected to a high potential terminal of the DC link capacitor, among the switching elements of the third leg, to remain in an open state, and control the other switching element connected to a low potential terminal of the DC link capacitor, among the switching elements of the third leg, to remain in a short-circuit state.

The power factor compensation circuit may further include an additional switch configured to selectively determine an electric connection state between the first input/output terminal and the second input/output terminal.

In the DC power supply mode, the controller may be configured to control the additional switch in a short-circuit state, and perform PWM control on the switching elements in the first leg and the switching elements in the second leg at the same duty ratio.

In the DC power supply mode, the controller may be configured to control the additional switch in an open state, and perform PWM control on the switching elements in the first leg and the switching elements in the second leg at different duty ratios.

The charger capable of bidirectional power transfer as described above may provide supply voltages to DC loads without adding or changing hardware.

In addition, the charger capable of bidirectional power transfer may adjust the magnitude of a provided voltage by raising or lowering the voltage of the battery using the bidirectional DC converter in the charger, thereby outputting a wide range of DC power voltages.

Furthermore, the charger capable of bidirectional power transfer may output a DC voltage irrespective of the voltage of the battery when the state of charge of the battery is sufficient. Thus, the charger is not influenced by the voltage of the battery itself.

It will be appreciated by those skilled in the art that the effects that can be achieved with the present disclosure are not limited to those described above and other advantages of the present disclosure will be clearly understood from the following detailed description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, a charger capable of bidirectional power transfer according to an embodiment of the present disclosure will be described in detail with reference to the accompanying drawings.

Figure 1:
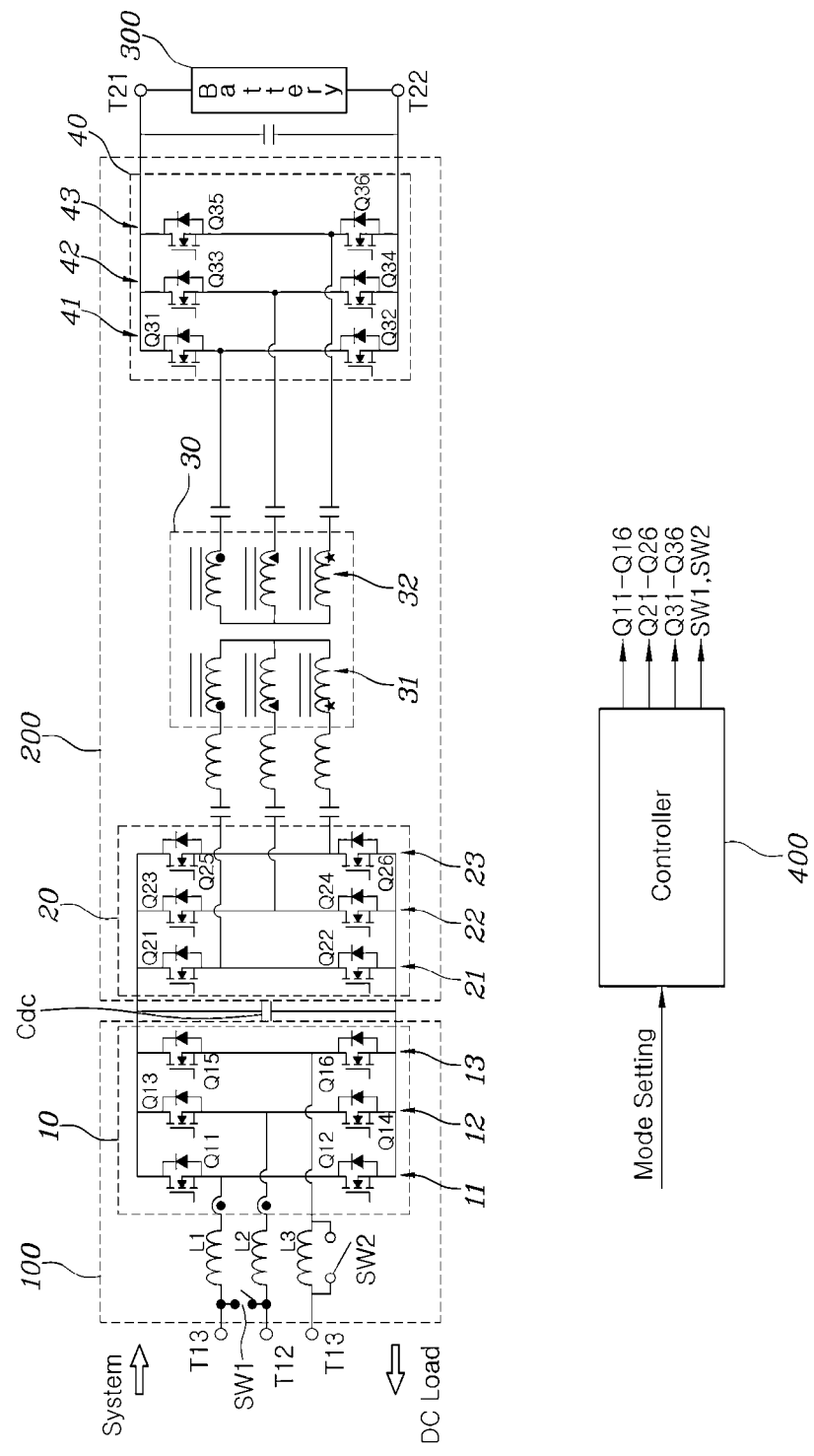
FIG. 1 is a circuit diagram illustrating a charger capable of bidirectional power transfer according to an embodiment of the present disclosure.

FIG. 1 is a circuit diagram illustrating a charger capable of bidirectional power transfer according to an embodiment of the present disclosure.

Referring to FIG. 1, the charger capable of bidirectional power transfer according to an embodiment of the present disclosure may include a power factor compensation circuit 100 capable of bidirectional power transfer, a direct current (DC) converter 200 capable of bidirectional power transfer, and a controller 400 controlling the power factor compensation circuit 100 and the DC converter 200.

The power factor compensation circuit 100 may include: first to third input/output terminals T11, T12, and T13, through which AC charging power provided from an external source outside a vehicle is input to charge a battery 300 or DC power is output to the outside of the vehicle from the battery 300 to supply load power; a plurality of inductors L1, L2, and L3, one end of each of which is connected to the corresponding one of the first to third input/output terminals T11, T12, and T13; and a full bridge circuit 10 connected to the other ends of the inductors L1, L2, and L3.

The full bridge circuit 10 in the power factor compensation circuit 100 may include a plurality of legs 11, 12, and 13 connected to each other in parallel. The plurality of legs 11, 12, and 13 include two switching elements Q11 and Q12 connected in series, two switching elements Q13 and Q14 connected in series, and two switching elements Q15 and Q16 connected in series, respectively.

Two switching elements of each of the plurality of legs 11, 12, and 13 are connected to each other at a node, to which the other end of the corresponding one of the plurality of inductors L1, L2, and L3 may be connected.

In addition, the power factor compensation circuit 100 may further include a first switch SW1 configured to short-circuit or electrically open one ends of the inductors L1 and L2 connected to two legs 11 and 12 of the plurality of legs 11, 12, and 13, i.e., the first input/output terminal T11 and the second input/output terminal T12, respectively. The first switch SW1 may be a switch causing the first input/output terminal T11 and the second input/output terminal T12 to be an electrically common node.

In addition, the power factor compensation circuit 100 may further include a second switch SW2 configured to short-circuit or electrically open both ends of the inductor L3 connected to the remaining leg to which the first switch SW1 is not connected. The switch SW2 may be a bypass switch providing a bypass path to the inductor L3.

A capacitor Cdc in which a DC link voltage is formed may be connected to both ends of each of the plurality of legs 11, 12, and 13 of the bridge circuit in the power factor compensation circuit 100.

In case of battery charge mode in which three-phase AC power is applied to the first to third input/output terminals T11, T12, and T13 to charge the battery 300, the power factor compensation circuit 100 may provide the AC charging power to the DC link capacitor Cdc by compensating the power factor of the AC charging power input from the input/output terminals T11, T12, and T13 corresponding to the phases, respectively, thereby inducing an AC link voltage on both ends of the DC link capacitor Cdc.

Referring to a circuit connection structure corresponding to a single phase (e.g., the phase corresponding to the inductor L1), a reverse diode of the switching element Q11 connected to the inductor L1 and to a point between the inductor L1 and the DC link capacitor Cdc and the switching element Q12 connected to a connection node of the inductor L1 and the switching element Q11 and to the other end of the DC link capacitor Cdc form the topology of the boost converter when powering is performed in the direction of the battery 300.

As described above, the circuit connection structure of each phase forms a power factor compensation circuit based on the topology of the boost converter well-known in the art. Proper switching control of the switching elements Q11 to Q16 makes it possible to form a DC link voltage in the DC link capacitor Cdc while improving the power factor of the input AC charging power in the battery charge mode.

In addition, in DC supply mode in which DC supply power is supplied to DC loads connected to at least some of the first to third input/output terminals T11, T12, and T13, the power factor compensation circuit 100 may supply the DC supply power to the DC loads connected to the first to third input/output terminals T11, T12, and T13 by dropping the DC link voltage.

Referring to the circuit connection structure corresponding to a single phase (e.g., the phase corresponding to the inductor L1), the switching element Q11 connected to the inductor L1 and the DC link capacitor Cdc, the reverse diode of the switching element Q12 connected to the connection node of the inductor L1 and the switching element Q11 and to the other end of the DC link capacitor Cdc, and the inductor L1 form the topology of a buck converter when powering is enabled in the direction of the first to third input/output terminals T11, T12, and T13.

When a high potential of a DC power voltage is applied to the corresponding input/output terminal by realizing a buck converter using a circuit connected to at least one of the first to third input/output terminals T11, T12, and T13 and a low potential of the DC power voltage is applied to at least one of the remaining input/output terminals T11, T12, and T13 using the switching element of the circuit connected to the corresponding input/output terminal, a supply voltage having an intended magnitude may be generated by applying a buck converter control method of the technical field to which the present disclosure pertains.

The DC converter 200 may convert the magnitude of the bidirectional DC voltage between the DC link capacitor Cdc and the battery 300. In the charge mode, the DC converter 200 may apply the DC voltage formed in the DC link capacitor Cdc to the battery 300 by converting the DC voltage to a magnitude by which the battery 300 can be charged. In addition, in DC supply mode, the DC converter 200 may apply the voltage of the battery 300 to the DC link capacitor Cdc by converting the magnitude of the voltage.

The bidirectional DC-DC converter 200 illustrated in FIG. 1 may include two bridge circuits 20 and 40 and a transformer 30 disposed between the two bridge circuits 20 and 40.

The bridge circuit 20 from the bridge circuits of the bidirectional DC-DC converter 200, directly connected to a system or a load, i.e., to the power factor compensation circuit 100, may include a plurality of legs 21, 22, and 23 connected to both ends of the DC capacitor Cdc in a parallel relationship. Each of the legs 21, 22, and 23 may include two switching elements connected to each other in series. That is, the leg 21 may include two switching elements Q21 and Q22 connected in series, the leg 22 may include two switching elements Q23 and Q24 connected in series, and the leg 23 may include two switching elements Q25 and Q26 connected in series.

A plurality of coils 31 provided on the first side of the transformer 30 may be connected to the connection node of switching element of each of the legs 21, 22, and 23.

In an embodiment of the present disclosure, the bridge circuit 20 connected to the first coils 31 of the transformer 30 of the bidirectional DC-DC converter 200 may be configured to have the three legs 21, 22, and 23 so as to generate AC voltages having three different phases or generate a DC voltage by rectifying AC voltages having three different phases.

Thus, in the bidirectional DC-DC converter, a bridge circuit 40 connected to second coils 32 of the transformer 30 may also include three legs 41, 42, and 43 each including two switching elements.

The bridge circuit 40 among the bridge circuits of the bidirectional DC-DC converter 200, directly connected to the battery 300, may include the plurality of legs 41, 42, and 43 connected to both ends of the battery 300 in a parallel relationship. Each of the legs 41, 42, and 43 may include two switching elements connected in series. That is, the leg 41 may include two switching elements Q31 and Q32 connected in series, the leg 42 may include two switching elements Q33 and Q34 connected in series, and the leg 43 may include two switching elements Q35 and Q36 connected in series.

The plurality of coils 31 provided on the second side of the transformer 30 may be connected to the connection node of the switching element included in each of the legs 41, 42, and 43.

In an embodiment of the present disclosure, the bridge circuit 40 connected to the second coils 32 of the transformer 30 of the bidirectional DC-DC converter 200 is configured to have the three legs 41, 42, and 43 so as to generate a DC voltage by rectifying AC voltages having three different phases or generate AC voltages having three different phases.

The switching state of the switching elements included in the bridge circuit 20 and the bridge circuit 40 may be controlled by pulse width modulation (PWM) control. Bidirectional AC-DC conversion of converting an AC voltage into a DC voltage or converting a DC voltage into an AC voltage may be performed.

For example, in the battery charge mode in which the battery 300 is charged by providing power input from the system to the battery 300, the switching elements included in the bridge circuit 20 perform DC-AC conversion to convert a DC voltage applied to the DC capacitor Cdc into an AC voltage, whereas the switching elements included in the bridge circuit 40 performs AC-DC conversion to convert an AC voltage provided from the second coils 32 of the transformer 30 into a DC voltage by which the battery 300 can be charged.

In addition, in DC power supply mode in which DC power is generated by converting the DC power of the battery 300 into AC power, the switching elements included in the bridge circuit 40 perform DC-AC conversion to convert the DC voltage of the battery 100 into an AC voltage, whereas the switching elements included in the bridge circuit 20 perform AC-DC conversion to convert an AC voltage provided from the first coils 32 of the transformer 32 into a DC voltage and providing the DC voltage to the DC capacitor Cdc.

For power transfer between the bridge circuits 20 and 40 having at least three legs, the transformer 30 may be implemented as a multi-phase transformer in which the first coils 31 are three coils and the second coils 32 are three coils so as to be electromagnetically induced to each other. The plurality of first coils 31 may form a Y connection or a delta (Δ) connection and the plurality of second coils 32 may form a Y connection or a delta (Δ) connection.

The bidirectional DC-DC converter 200 illustrated in FIG. 1 is an example of an LLC converter in which a resonant circuit including a capacitor and an inductor is added to the first side of the transformer 30. However, the present disclosure is not limited to the LLC converter structure illustrated in FIG. 1, and insulation may be realized using a transformer, such as a phase shift converter structure without a resonant circuit or a CLLC converter structure in which a resonant circuit including a capacitor and an inductor is added to the second side of the transformer 30. A variety of publicly-known converter topologies each including a bridge circuit able to generate a phase voltage having a plurality of phases by the switching of the switching elements may be used in the present disclosure.

The battery 300 is a component storing electric energy to provide high-voltage DC power to a vehicle driving motor in an environmentally friendly vehicle, such as an electric vehicle, driven by electric energy. Both ends of the battery 300 may be connected to the battery-side input/output terminals T21 and T22 of the bidirectional charger. The battery 300 may be charged with charging power provided through the power factor compensation circuit 100 and the DC-DC converter 200 described above.

In addition, the DC power stored in the battery 300 may be converted into DC supply power having a predetermined magnitude by the DC-DC converter 200 and the power factor compensation circuit 100 and then be provided to the DC loads. That is, the battery 300 may be a power source supplying power to the loads through a charging circuit capable of bidirectional powering.

The switches SW1 and SW2 and the switching elements Q11 to Q16, Q21 to Q26, Q31 to Q36 described above may be controlled by the controller 400. The controller 400 may receive an operation mode of the charger input from an upper level controller and control the switches SW1 and SW2 and the switching elements Q11 to Q16, Q21 to Q26, and Q31 to Q36 to be compliant with the input mode.

Hereinafter, a control method by the controller 400 will be described in more detail with reference to FIG. 2.

Figure 2:
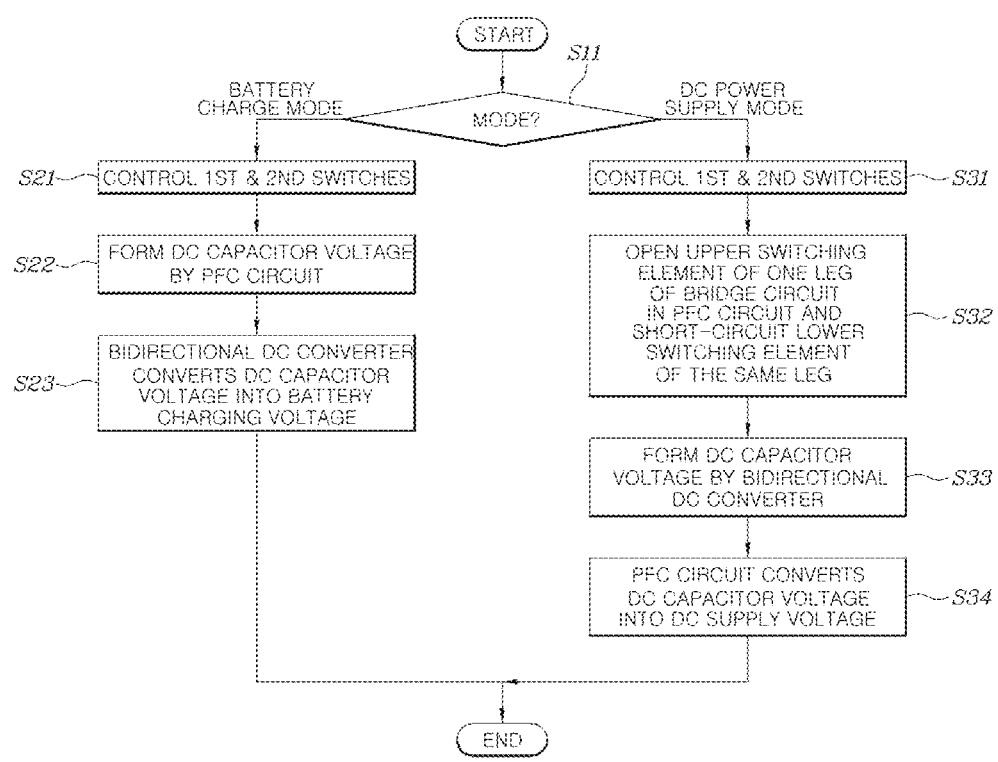
FIG. 2 is a flowchart illustrating a method of controlling a charger capable of bidirectional power transfer according to an embodiment of the present disclosure.

FIG. 2 is a flowchart illustrating a method of controlling a charger capable of bidirectional power transfer according to an embodiment of the present disclosure.

Referring to FIG. 2, the method of controlling a charger capable of bidirectional power transfer according to an embodiment of the present disclosure may start in step S11 of receiving, by the controller 400, preset information regarding charger operation mode and determining the operation mode of the bidirectional charger.

When the operation mode of the bidirectional charger is determined to be a battery charge mode, the controller 400 may control the first switch SW1 and the second switch SW2 in the power factor compensation circuit 100 in step S21.

In an example, when three-phase AC power is input to the first to third input/output terminals T11, T12, and T13, the controller 400 may open both the first switch SW1 and the second switch SW2 in order to form a DC voltage in the DC link capacitor Cdc using all AC power input to the input/output terminal.

In another example, when single-phase AC power is input only using two input/output terminals among the first to third input/output terminals T11, T12, and T13, it is possible to only open the first switch SW1 and short-circuit the second switch SW3, so that a single-phase input may be provided through one of the first input/output terminal T11 and the second input/output terminal T12 and through the third input/output terminal T13.

Afterwards, in step S22, the controller 400 may improve the power factor of the AC power input to the first to third input/output terminals T11, T12, and T13 and form a DC voltage in the DC link capacitor Cdc by performing PWM control on the switching elements Q11 to Q16 of the bridge circuit 10 in the power factor compensation circuit 100.

Subsequently, in step S23, the controller 400 may convert the magnitude of the DC voltage formed in the DC link capacitor Cdc into a magnitude by which the battery 300 can be charged by controlling the switching elements Q21 to Q26, Q31 to Q36 in the bidirectional DC converter 200, so that the DC voltage may be applied to the battery-side input/output terminals T21 and T22 as a battery charging voltage.

The control over the switching elements Q11 to Q16, Q21 to Q26, and Q31 to Q36 in the step S22 and the step S23 may be performed by a typical control method for a power factor compensation circuit or a typical control method for a DC converter known in the technical field to which the present disclosure pertains, and thus, a description of a detailed control method for the switching elements will be omitted.

In addition, when the operation mode of the bidirectional charger is determined to be a DC power supply mode in the step S11, the controller 400 may control the first switch SW1 and the second switch SW2 in the power factor compensation circuit 100 in step S31.

In an example, the controller 400 may control the second switch SW2 to be in a short-circuit state in order to use the third input/output terminal as a terminal corresponding to a low potential of the DC voltage.

In addition, the controller 400 may control the first switch SW1 to be in the short-circuit state, thereby causing DC voltages having the same magnitude to be provided to the first input/output terminal T11 and the second input/output terminal T12.

In another example, the controller 400 may control the first switch SW1 to be in an open state, thereby causing DC voltages having different magnitudes to be provided to the first input/output terminal T11 and the second input/output terminal T12.

The controller 400 may control the switching duty of the PWM control of controlling the switching elements Q11 to Q14 in the bridge circuit 10 depending on the state of the first switch SW1.

Afterwards, in step S32, the controller 400 may determine the state of the switch elements Q15 and Q16 included in the single leg 13, to which the low potential of the DC voltage is applied, among the switching elements Q11 to Q16 in the bridge circuit 10.

More specifically, the controller 400 may control the upper switching element Q15 connected to the high potential terminal of the DC link capacitor Cdc, among the switching elements included in the leg 13, to constantly remain in the open state and the lower switching element Q16 connected to the low potential terminal of the DC link capacitor Cdc, among the switching elements included in the leg 13, to constantly remain in the short-circuit state.

Due to this control, the third input/output terminal T13 may be short-circuited to the low potential terminal of the DC link capacitor Cdc, and the potential of the third input/output terminal T13 may be a reference potential the same as the low potential of a DC voltage applied to an external DC load, i.e., the low potential of the DC link capacitor Cdc.

Subsequently, in step S33, the controller 400 may convert the magnitude of the voltage of the battery 300 by performing switching control on the switching elements Q21 to Q26 and Q31 to Q36 in the bidirectional DC converter 200 in a PWM manner, thereby applying the voltage to the DC link capacitor Cdc. Due to the step S33, the DC voltage may be applied to the DC link capacitor Cdc.

In the step S33, the maximum magnitude of the voltage applied to the DC link capacitor Cdc by the bidirectional DC converter 200 may be determined by the internal voltage of the DC link capacitor Cdc and be at least greater than a DC supply voltage provided to the outside.

Subsequently, in step S34, the controller 400 may convert the magnitude of the DC voltage formed in the DC link capacitor Cdc by performing PWM control on the switching elements Q11 to Q16 of the bridge circuit 10 in the power factor compensation circuit 100 so that the converted DC voltage is provided to the first to third input/output terminal T11 to T13, thereby providing the supply power to the external DC loads.

In an example, when the first switch SW1 is in the short-circuit state in the step S31, the controller 400 may perform PWM control on the switching elements of the leg 11 and the switching elements of the leg 12 at the same duty, thereby applying the same DC voltage to the first input/output terminal T11 and the second input/output terminal T12. In this case, only one of the first input/output terminal T11 and the second input/output terminal T12 may be connected to a single external DC load or the first input/output terminal T11 and the second input/output terminal T12 may be connected to different DC loads, respectively.

In another example, when the first switch SW1 is in the open state in the step S31, the controller 400 may perform PWM control on the switching element of the leg 11 and the switching element of the leg 12 at different duties, thereby applying different DC voltages to the first input/output terminal T11 and the second input/output terminal T12. In this case, the DC loads using supply voltages having different magnitudes may be connected to the first input/output terminal T11 and the second input/output terminal T12, respectively.

The controller 400 may include a processor or a microprocessor. Optionally, the controller 400 may also include a memory. The aforementioned operations/functions of the controller 400 can be embodied as computer readable code/algorithm/software stored on the memory thereof which may include a non-transitory computer readable recording medium. The non-transitory computer readable recording medium is any data storage device that can store data which can thereafter be read by the processor or the microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The processor or the microprocessor may perform the above described operations/functions of the controller 400, by executing the computer readable code/algorithm/software stored on the non-transitory computer readable recording medium.

As set forth above, the charger capable of bidirectional power transfer according to a variety of embodiments of the present disclosure may provide supply voltages to DC loads without adding or changing hardware.

In addition, the charger capable of bidirectional power transfer according to a variety of embodiments of the present disclosure may adjust the magnitude of a provided voltage by raising or lowering the voltage of the battery using the bidirectional DC converter in the charger, thereby outputting a wide range of DC power voltages.

In addition, the charger capable of bidirectional power transfer according to a plurality of embodiments of the present disclosure may output a DC voltage irrespective of the voltage of the battery when the state of charge of the battery is sufficient. Thus, the charger is not influenced by the voltage of the battery itself.

Although specific embodiments of the present disclosure have been described and illustrated, those skilled in the art will appreciate that various alternations and modifications are possible without departing from the technical spirit of the present disclosure as disclosed in the appended claims.

What is claimed is:

1. A charger capable of bidirectional power transfer, comprising:
 a power factor compensation circuit configured to convert a multi-phase AC voltage into a DC voltage and comprising a plurality of inductors and a plurality of switching elements;
 a DC link capacitor to which the DC voltage converted by the power factor compensation circuit is applied;
 a bidirectional DC converter configured to bidirectionally convert a magnitude of a voltage between the DC link capacitor and a battery; and
 a controller configured to: in a DC power supply mode, control the bidirectional DC converter to convert a magnitude of a voltage of the battery to apply the voltage of the battery to the DC link capacitor, and control the plurality of switching elements to generate a DC supply voltage by converting the magnitude of the DC voltage of the DC link capacitor and output the DC supply voltage through a terminal through which the multi-phase AC voltage is input.

2. The charger of claim 1, wherein the power factor compensation circuit comprises:
a plurality of input/output terminals through each of which the multi-phase AC voltage is input or the DC supply voltage is output;
a plurality of inductors respectively having one end connected to a corresponding one of the plurality of input/output terminals; and
a bridge circuit comprising a plurality of legs connected to the DC link capacitor in parallel, each of the plurality of legs comprising two switching elements connected in series among the plurality of switching elements,
wherein nodes in the plurality of legs, to which the switching elements are connected, are connected to the other ends of the plurality of inductors, respectively.

3. The charger of claim 2, wherein, in the DC power supply mode, the controller is configured to control the switching elements to apply the DC voltage of the DC link capacitor to the plurality of input/output terminals by converting the magnitude of the DC voltage of the DC link capacitor, and
in a battery charge mode in which the battery is to be charged, the controller is configured to control the switching elements to convert the multi-phase AC voltage applied to the plurality of input/output terminals into the DC voltage and to apply the DC voltage to the DC link capacitor.

4. The charger of claim 2, wherein the power factor compensation circuit further comprises a bypass switch connected to both ends of one inductor among the plurality of inductors to selectively form a bypass path of the inductor to which the bypass switch is connected.

5. The charger of claim 4, wherein, in the DC power supply mode, the controller is configured to control the bypass switch in a short-circuit state, control one switching element connected to a high potential terminal of the DC link capacitor, among the switching elements of a leg connected to the inductor to which the bypass switch is connected, to remain in an open state, and control the other switching element connected to a low potential terminal of the DC link capacitor, among the switching elements of the leg connected to the inductor to which the bypass switch is connected, to remain in a short-circuit state.

6. The charger of claim 2, wherein the power factor compensation circuit further comprises an additional switch configured to selectively determine an electric connection state between two input/output terminals among the plurality of input/output terminals.

7. The charger of claim 6, wherein, in the DC power supply mode, the controller is configured to control the additional switch in a short-circuit state, and perform PWM control on the switching elements in a leg among the plurality of legs, connected to one end of the additional switch through a corresponding inductor among the plurality of inductors, and the switching elements in a leg among the plurality of legs, connected to the other end of the additional switch through a corresponding inductor among the plurality of inductors, at the same duty ratio.

8. The charger of claim 6, wherein, in the DC power supply mode, the controller is configured to control the additional switch in an open state, and perform PWM control on the switching elements in a leg among the plurality of legs, connected to one end of the additional switch through a corresponding inductor among the plurality of inductors, and the switching elements in a leg among the plurality of legs, connected to the other end of the additional switch through a corresponding inductor among the plurality of inductors, at different duty ratios.

9. A charger capable of bidirectional power transfer, comprising:
a power factor compensation circuit comprising:
a first input/output terminal;
a first inductor having one end connected to the first input/output terminal;
a second input/output terminal;
a second inductor having one end connected to the second input/output terminal;
a third input/output terminal;
a third inductor having one end connected to the third input/output terminal; and
a bridge circuit comprising a first leg comprising two switching elements connected in common to the other end of the first inductor, a second leg connected to the first leg in parallel and comprising two switching elements connected in common to the other end of the second inductor, a third leg connected to the first leg in parallel and comprising two switching elements connected in common to the other end of the third inductor;
a DC link capacitor connected to the first leg in parallel;
a bidirectional DC converter configured to bidirectionally convert a magnitude of a voltage between the DC link capacitor and a battery; and
a controller configured to: in a DC power supply mode, control the bidirectional DC converter to convert the magnitude of a voltage of the battery to apply the voltage of the battery to the DC link capacitor, and control the switching elements of the first to third legs to convert the magnitude of a DC voltage of the DC link capacitor to be output to the first to third input/output terminals.

10. The charger of claim 9, wherein the power factor compensation circuit further comprises a bypass switch connected to both ends of the third inductor to selectively form a bypass path of the third inductor.

11. The charger of claim 10, wherein, in the DC power supply mode, the controller is configured to control the bypass switch in a short-circuit state, control one switching element connected to a high potential terminal of the DC link capacitor, among the switching elements of the third leg, to remain in an open state, and control the other switching element connected to a low potential terminal of the DC link capacitor, among the switching elements of the third leg, to remain in a short-circuit state.

12. The charger of claim 9, wherein the power factor compensation circuit further comprises an additional switch configured to selectively determine an electric connection state between the first input/output terminal and the second input/output terminal.

13. The charger of claim 12, wherein, in the DC power supply mode, the controller is configured to control the additional switch in a short-circuit state, and perform PWM control on the switching elements in the first leg and the switching elements in the second leg at the same duty ratio.

14. The charger of claim 12, wherein, in the DC power supply mode, the controller is configured to control the additional switch in an open state, and perform PWM control on the switching elements in the first leg and the switching elements in the second leg at different duty ratios.

\* \* \* \* \*